G. HILDEBRANDT.
PROCESS OF SEPARATING LIQUID AIR INTO ITS CONSTITUENTS.
APPLICATION FILED OCT. 16, 1912.

1,119,158.

Patented Dec. 1, 1914.
4 SHEETS—SHEET 1.

Witnesses:
Geo. C. Chenery
W. G. Pauling

Inventor
Gotthold Hildebrandt
By his Attorneys
Gifford & Bull

G. HILDEBRANDT.
PROCESS OF SEPARATING LIQUID AIR INTO ITS CONSTITUENTS.
APPLICATION FILED OCT. 16, 1912.

1,119,158.

Patented Dec. 1, 1914.
4 SHEETS—SHEET 2.

Witnesses:
Geo. C. Lehmey
W. A. Pauling

Inventor
Gotthold Hildebrandt
By his Attorney
Gifford Bull

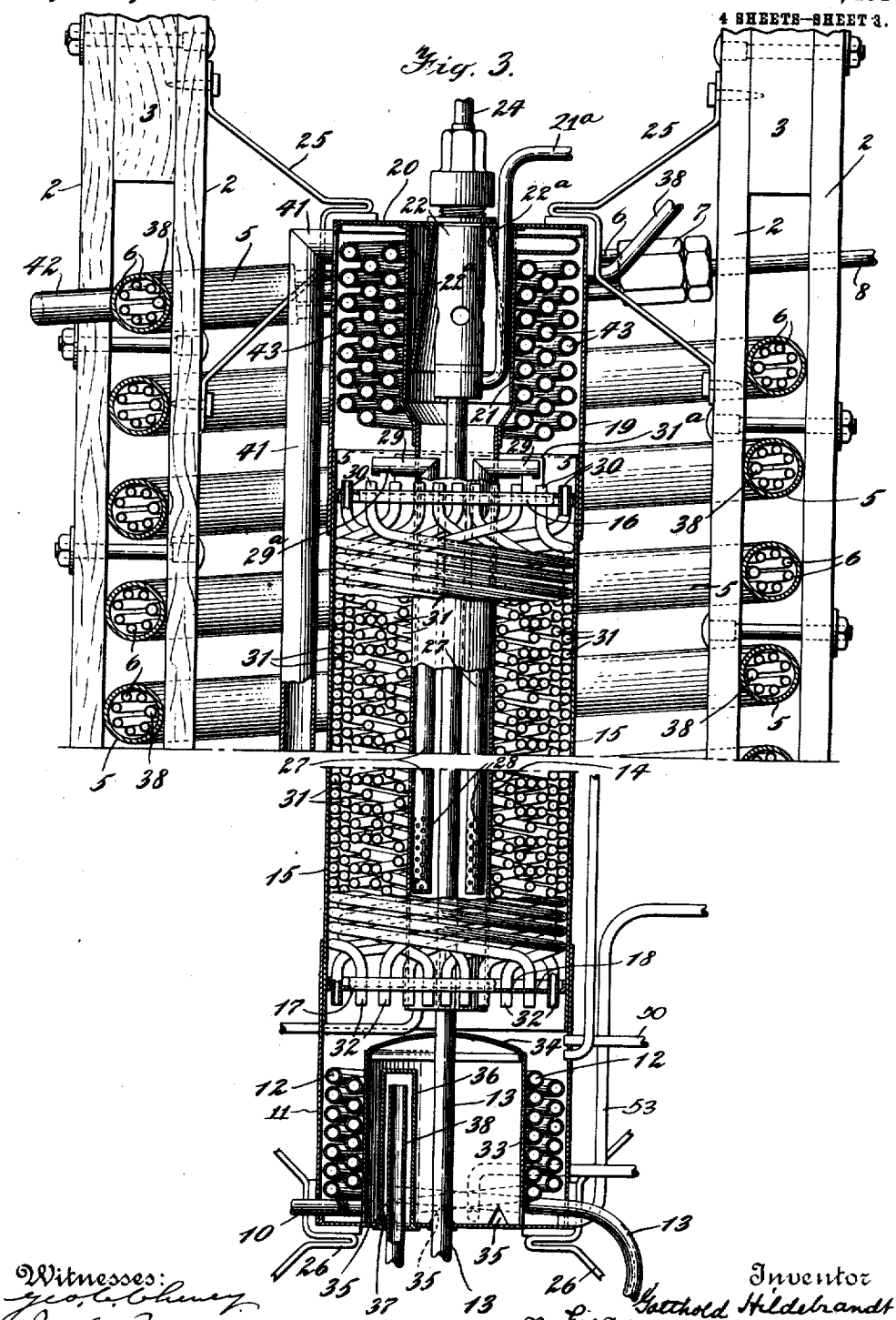

G. HILDEBRANDT.
PROCESS OF SEPARATING LIQUID AIR INTO ITS CONSTITUENTS.
APPLICATION FILED OCT. 16, 1912.
1,119,158.
Patented Dec. 1, 1914.
4 SHEETS—SHEET 4.
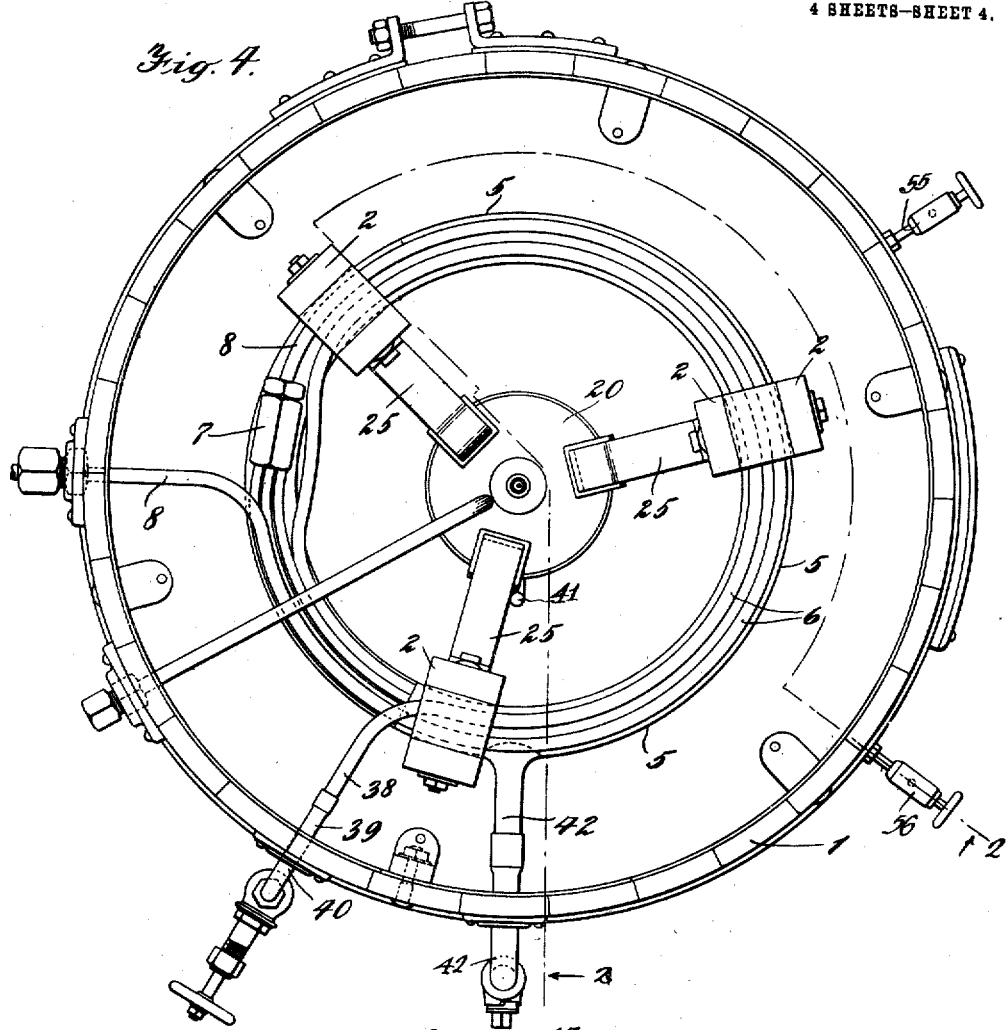
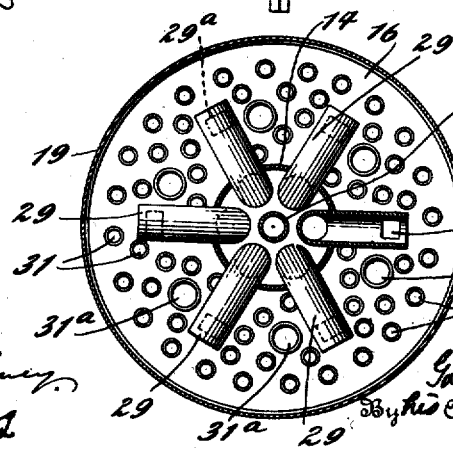

UNITED STATES PATENT OFFICE.

GOTTHOLD HILDEBRANDT, OF BERLIN, GERMANY, ASSIGNOR TO AMERICAN INDUSTRIAL GAS COMPANY, OF NEW YORK, N. Y., A CORPORATION OF NEW YORK.

PROCESS OF SEPARATING LIQUID AIR INTO ITS CONSTITUENTS.

1,119,158.     Specification of Letters Patent.     Patented Dec. 1, 1914.

Application filed October 16, 1912. Serial No. 725,988.

*To all whom it may concern:*

Be it known that I, GOTTHOLD HILDEBRANDT, a subject of the Emperor of Germany, residing at Berlin, German Empire, have invented certain new and useful Improvements in The Process of Separating Liquid Air Into Its Constituents, of which the following is a specification.

My invention relates broadly to new and useful improvements in processes of liquefying air and separating the same into its constituents.

The invention consists in the process to be more fully described hereinafter and the novelty of which will be particularly pointed out and distinctly claimed.

I have fully and clearly illustrated my invention in the accompanying drawings to be taken as a part of this specification, and wherein—

Figure 1:
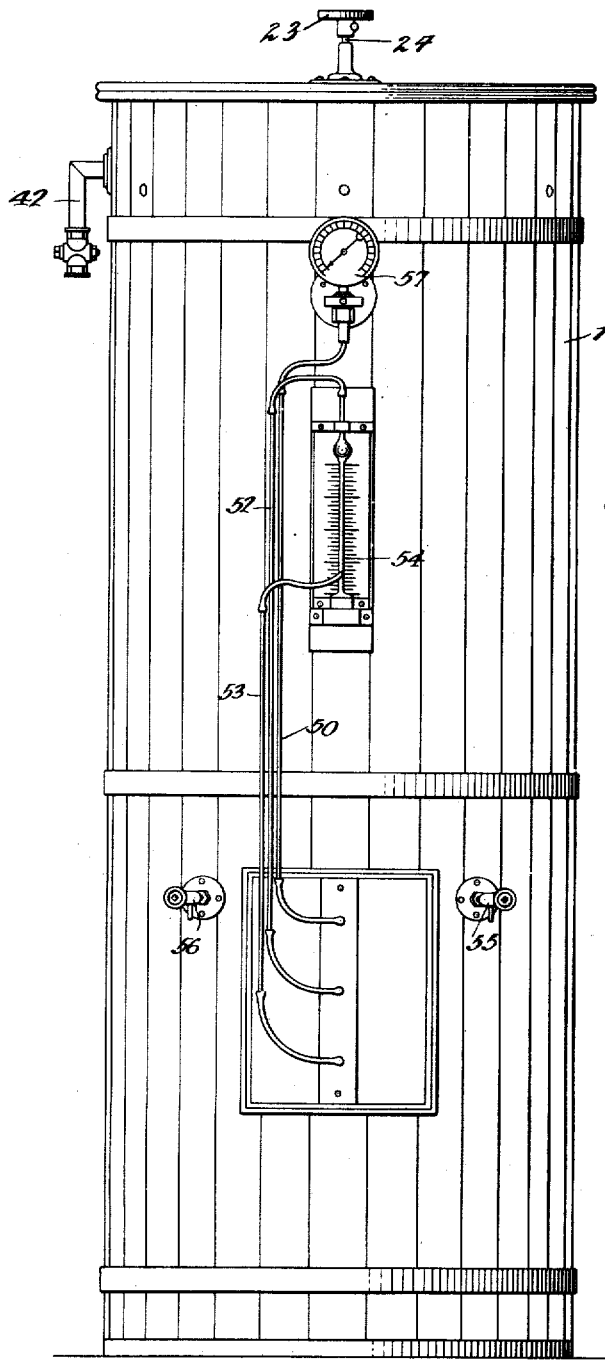
Figure 2:
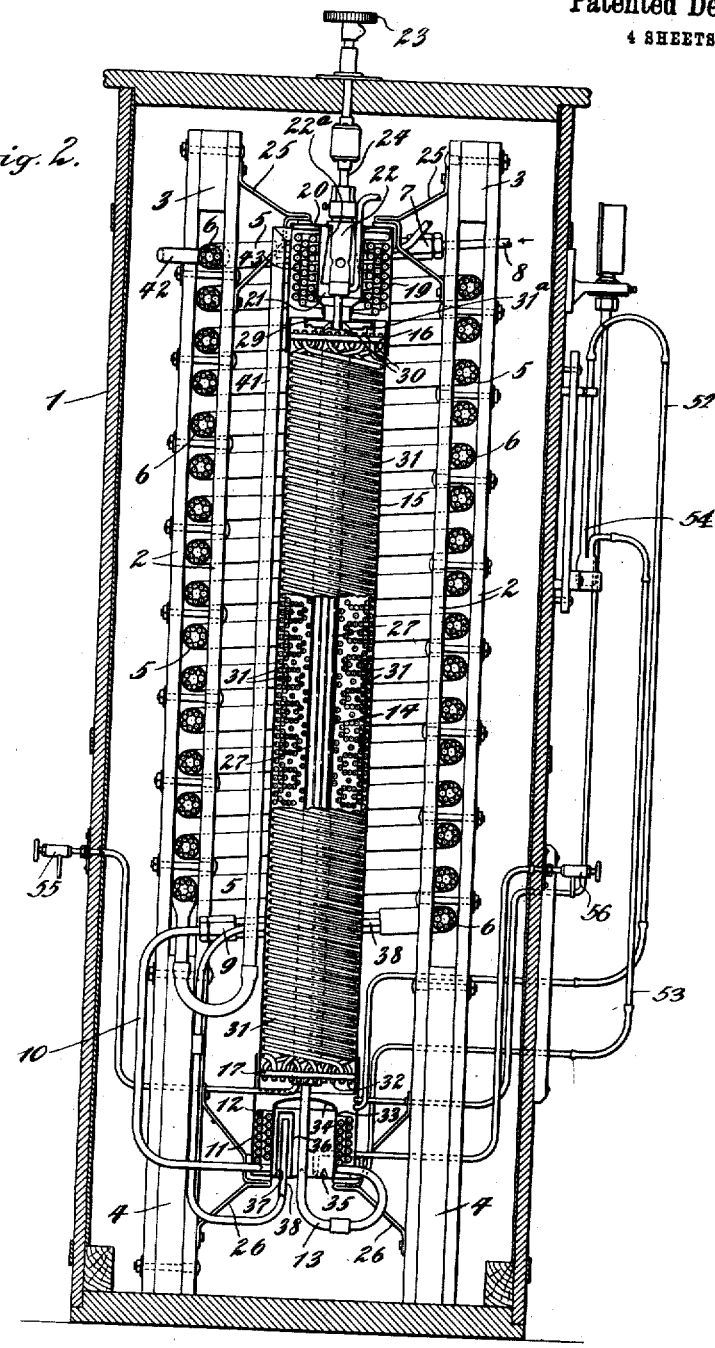

Figure 1 is a view in elevation of the exterior of an apparatus embodying my invention. Fig. 2 is an internal view of the apparatus substantially on the line 2—2 of Fig. 4, the parts being in elevation and certain parts being developed into the same plane for clearness and simplification of the showing, parts being broken away and other parts being in section. Fig. 3 is an enlarged detailed sectional view. Fig. 4 is a top plan view of the apparatus with the cover removed. Fig. 5 is a sectional view on the line 5—5 of Fig. 3.

Referring to the drawings by characters of reference, 1 designates a casing of any suitable construction, within which is inclosed the apparatus and elements for performing the liquefaction and separating functions as will be more fully set forth hereinafter. This apparatus, while capable of wide variation without departing from the intended scope of my invention, is shown in this application in what appears to me at this time to be its preferred embodiment, said apparatus consisting of vertical supports each consisting of a pair of spaced members 2, 2, resting at their lower ends on the base of the casing 1, said members 2, 2, of each pair being spaced by spacing blocks 3, 4, at the upper and lower ends respectively of said members.

Arranged in the free space between each of the members 2, 2, and the blocks 3, 4, spacing the same is a counter-current apparatus consisting of an outer coil of pipe 5, preferably of lead, the upper end of which is closed. Arranged within the pipe 5, is a plurality of small conduits or tubes 6, shown as six in number, to conduct compressed air to the apparatus, said pipes being coiled within the pipe 5 and following the same throughout its length. These pipes or tubes 6 are preferably made of copper, and are each supported in contact with the inner surface of the pipe 5 for a purpose to be more fully set forth hereinafter. The tubes 6 emerge through the upper closed end of the pipe 5 and are connected by a reducing coupling or nipple 7 to an inlet pipe 8, the latter pipe being connected to any suitable source of air or gas under pressure, such for instance, as an air compressor. The connection between the pipe 8 and the tubes 6 is such that air or gas flowing through said pipe 8 enters the small tubes 6, but does not enter the free space in the bore of the pipe 5 which surrounds said tubes.

I do not limit myself to the length of pipe 5, or to its diameter, or to the number of tubes 6 contained therein, as these may be varied according to the size or capacity of the installation, nor do I limit myself to the material of which the pipe and tubes are made.

The pipe 5 is closed at its lower end, through which closed end the tubes 6 emerge and are connected by a reduction nipple or coupling 9 to a pipe 10 so that the compressed air which enters the said tubes at the coupling 7 will emerge from said tubes at the coupling 9 and enter the pipe 10. This pipe 10 enters the interior of a chamber or receptacle 11, adapted to receive liquid oxygen, where said pipe 10 is coiled to form a heating element 12. Connected to the coil or heating element 12 is an outlet pipe 13 therefor, which passes outside the chamber 11 and is then carried up through the same and through a cylinder 14 extending vertically and centrally, through a vertical cylinder 15 mounted on the upper end or forming a continuation of the receptacle 11. This cylinder or shell 15, which is imperforate, is of such a length as to extend from a point below the outlet end of the counter current coil 5 to a point just below the upper end of said coil, said cylinder being closed at is upper and lower ends by heads 16, 17, respectively, the head 16 being imperforate and the head 17 being perforated as at 18, see Fig. 3, for a purpose to be presently set forth.

At its upper end, the shell 15 supports a chamber 19, having its upper end closed by a head 20, the purpose of which chamber will be set forth presently.

The column 14 which is closed at its lower end, extends through and above the head 16 of the cylinder 15, and carries and communicates with an expansion chamber 21, the upper end of which engages and is closed by the said head 20. The said chamber 21 is preferably concentric with the chamber 19 and contains an expansion valve 22 of any suitable construction, to the casing of which valve the pipe 13 is connected, said valve controlling the outlet from said pipe. The expansion valve is regulated by the hand wheel 23 and shaft 24, the wheel being located outside the casing. The expansion valve is surrounded by a splasher cone $22^a$ by means of which the expanded and liquefied air is deflected down into the cylinder 14.

The chamber or receptacle 11, column 15 and chamber 19 may be supported in any suitable manner, as by upper and lower brackets 25, 26, engaging the head of the chamber 19 and the receptacle 11, as shown in Figs. 2 and 3 of the drawings.

Located within the cylinder 14 and extending from a point above the partition 16 to a point above the bottom of said cylinder is a plurality of vertically disposed pipes 27, perforated at their lower ends as at 28, and provided at their upper ends respectively with outlet branches 29 extending through the wall of the cylinder 14 and opening over the head 16, each branch having an opening $29^a$ in its lower side. By the arrangement of the pipe 13, expansion valve 22, cylinder 14 and pipes 27, it will be seen that the liquid air will pass down the cylinder 14 and surround the pipe 13, and then pass up in the tubes 27 which will deliver it upon the head 16.

Extending through the head 16, and opening into the space above said head, are the upper ends 30, of a plurality of pipes 31 which are arranged in coils within the shell 15 and about the cylinder 14, said coils being so arranged that a definite distance is maintained between the pipes, and this distance shall stand in a certain relation to the inner volume of the pipes, so that all of the pipes will be uniformly heated, as will appear hereinafter. The lower ends 32 of the pipe coils 31 extend through the bottom head 17 of the shell 15 and open into the receptacle 11 occupied by the heating coil 12 heretofore described and are normally sealed by the liquid in said receptacle. These pipes or coils 31 are preferably of copper and are of such length as to provide a long gradual incline for flow of liquid air from the chamber 19 to the receptacle 11, as will be more fully set forth in the description of the process and operation. These pipes 31 constitute what is in effect a rectification column, the function of which is to separate the liquid air flowing therein into its constituents. The pipes or coils 31 are preferably of copper and imperforate throughout their length, although they may be made of porous material if desired.

Communication is established between the space outside the coils 31 and the chamber 19 by means of escape ducts $31^a$, of such a height as to have their upper open ends located above the level of any body of liquid air which may be supported on the plate 16, so that gases may emerge therefrom but the liquid will not enter the same.

33 designates a dome or bell arranged centrally of the receptacle 11 and surrounded by the heating coil 12, said dome or bell having a perforated top or cap 34, and passages 35 at its bottom edge where it rests upon the floor of the receptacle 11. Within this dome or bell 33, is a closed top column 36, having an opening 37 at its bottom portion, and within which column 36, extends the open end of a pipe 38, which pipe extends from the interior of the column adjacent the top thereof out through the bottom of the receptacle 11 and into the closed end of the lead pipe 5 of the primary counter-currents apparatus, and through the latter, emerging therefrom at 39 and opening out through the casing at 40, said pipe 38 serving as the outlet for the oxygen from the apparatus. The column 36 prevents vaporized oxygen from entering the pipe 38.

Connected to the upper end of the chamber 19 is an outlet pipe 41 which extends down alongside the cylinder 15, and is connected at its lower end to the counter-current pipe 5, so that nitrogen from the chamber 19 will pass to the counter-current conduit 5, and then flow up therethrough to the last turn of the coil where a branch pipe 42 is provided by means of which the nitrogen passes off from the apparatus.

43 designates a coil located in the chamber 19 and surrounding the chamber 21, said coil having one end opening into the chamber 21 and the other end opening into the chamber 19. This coil 43 serves an important function in that little drops that are carried by the gas stream, will pass into said coil and form there big drops and then be conveyed to plate 16 together with the other liquid.

A pipe $21^a$ may be used to convey liquid air from the expansion valve when the liquid air is not to be rectified into its constituents.

For measuring the pressure inside the apparatus a suitable pipe such as 50 may be provided leading from the lower portion or other suitable portion of the apparatus to a pressure gage 51. Similarly pipes 52 and 53 may be provided leading from different levels to a suitable gage 54. By means of test cocks 55 and 56 arranged at different levels the nature of the products in different parts of the apparatus can be tested. The test cock 55 has been developed out of its true position in Fig. 2, in order that its arrangement may better appear.

The operation of the apparatus above described will now be described and in connection therewith the process carried out by the apparatus. When the apparatus is started compressed air, preferably freed from moisture and carbonic acid, enters the apparatus through the pipe 8, and is distributed therefrom into the tubes 6 of the counter-current apparatus, the air entering at a temperature of approximately 15° C. and a pressure which may be, e. g., 50 atmospheres or even a much higher pressure e. g. 150 to 250 atmospheres. The air then flows down through said tubes 6 to the coil 12 located in the chamber 11, whence it flows by the pipe 13 up through the shell 14 and is released from the expansion valve into the chamber 21 where the pressure is substantially atmospheric or slightly there below, e. g., 0.3 to 0.5 atmosphere. The release and expansion of the air cause a reduction in its temperature, according to the well known principle that air under pressure when released from a space of high pressure into a space of low pressure will have its temperature reduced, and results in liquefying a considerable portion of the air. The liquid air thus formed flows into the column 14 and as the level rises therein, said liquid air will enter the openings 28 and pass up through the pipes 27 and from the branch pipes 29 onto the head 16 which serves as a distributing plate for the inlet ends of the tubes 31 of the rectifying column. From this plate the liquid air flows down the coiled tubes 31 toward the chamber or receptacle 11. In this chamber 11 the liquid air is heated by means of the coil 12 and is partly evaporated, part of the heated products of evaporation passing up through the plate 17 and flowing through the spaces between the pipes 31 heats the said pipes, thereby causing the descending liquid air in said pipes 31 to be separated or rectified into nitrogen and oxygen, the liquid air becoming richer in oxygen as it approaches the lower ends of the tubes until almost pure liquid oxygen emerges from the lower ends of said tubes. The liquid oxygen flowing from the tubes 31, together with the liquid in the chamber 11 into which the ends of these tubes dip, form a liquid seal for the ends of the tubes and thus the entrance of oxygen vapors into the tubes to any considerable extent is prevented. The nitrogen gases flow from the upper ends of the tubes into the chamber 19 and from this chamber they flow through the pipe 41 to the lower end of the counter-current pipe 5 which they enter, and flowing through the same about the pipes 6, reduce the temperature of the incoming compressed air in said pipes so that the same is in effect refrigerated before being admitted to the pipe 13 leading to the expansion valve 22. The liquid oxygen which normally fills the receptacle 11 to a height of e. g. 6 to 8 centimeters, flows from this receptacle through the pipe 38 extending through the pipe 5 of the counter-current apparatus, in which pipe it is vaporized and the vapors together with the unvaporized liquid oxygen serve to reduce the temperature of the incoming compressed air.

In the normal operation of the apparatus after the liquefaction of the compressed air has started, and the nitrogen and oxygen have started to flow through the pipe 5 and the tube 38, the entering compressed air is cooled in the counter-current coil 5 to approximately —135° C., and this air is further cooled in passing through the coil 12 in the receptacle 11, said coil being surrounded by boiling oxygen, the temperature of which is approximately —183° C. The air in ascending the pipe 13, and being expanded from the valve 22, is more or less completely liquefied, the temperature after expansion being about —196° C. The air at this temperature, that is —196° C., flows into the column 14 and the pipe 28 and thence into the coils 31 where, by the ascending gases from the receptacle 11 it is warmed up to about —183°C. at which temperature it enters to receptacle 11. In this receptacle the coil 12 introduces enough heat to evaporate part of the liquid oxygen, the products of evaporation passing up through the column 14.

The dome 33 serves to deflect the liquid discharged from the tubes 31 onto the coil 12, so that the main heating and vaporizing of the liquid is effected outside this dome while the liquid within it is protected from the coil and kept in a relatively quiescent condition. Any oxygen vaporized within this dome escapes through its perforated top.

It will be seen that the apparatus, as illustrated and described, includes a primary counter-current apparatus comprising the coil 5, containing the compressed air pipes 6 and the oxygen pipe 38. During the operation of the apparatus the compressed air flows down the pipes 6, entering the same at approximately 15° C. at a pressure of e. g., 50 atm., while the nitrogen flows up through the free space and escapes at approximately 10° C. at a pressure of 1 atm. The liquid oxygen leaving the chamber 11 by the pipe 38 is vaporized and warmed in its passage through this pipe, and also leaves the counter-current coil at a temperature of about 10° C. and a pressure of 1 atmosphere. The result of the heat interchange which goes on in this counter-current apparatus is accordingly to reduce the temperature of the in-flowing compressed air to approximately −135° C., when it flows from the primary counter-current apparatus to the evaporating chamber 11.

In the evaporating chamber 11, which in fact constitutes in effect a second counter-current apparatus, the compressed air at a pressure of e. g., about 50 atm. is further cooled down by the boiling oxygen contained in said chamber and then ascends the pipe 13 and is expanded at the valve 22. After leaving the expansion valve, the liquid air at a temperature of about −196° C. and 1 atm. pressure, descends the cylinder 14 and rises in the pipes 27, so that the pipe 13 containing compressed air is subjected to the temperature reducing effect of the liquid air in the cylinder 14, so that the compressed air has its temperature further reduced before it reaches the expansion valve, at which point its pressure is substantially about 50 atm. before being released or expanded.

It will thus be seen that the compressed air is subjected to the temperature reducing effect of at least three counter-current conditions before it is finally expanded from the valve 22.

The rate at which the compressed air is released and expanded at the expansion valve 22 can be controlled by means of the hand wheel 23. If this rate is such that liquefaction takes place to a greater or less extent before the compressed air reaches the expansion valve, the liquefied air will be forced up the pipe 13 by the pressure of the compressed air behind it and will escape through the expansion valve together with the compressed unliquefied air. The expansion valve, however, will still accomplish its function of releasing the compressed air mixture and of causing a further reduction in temperature. This intense cooling action at the expansion valve makes this part of the apparatus the coldest, and causes what may be considered as a subcooling of the air mixture. In the chamber 21 around the expansion valve, and in the coil 32, through which the gas mixture flows from the chamber 21, the liquefaction is further effected as the temperature rises from that at the expansion valve to that of the new equilibrium between the liquefied air and the unliquefied air at atmospheric pressure, the rise in temperature being caused by the latent heat of liquefaction of the liquefied air. The nitrogen vapors rising outside the coil 43 at a temperature approximately −190° C. also serve to keep the coil cool and to assist in the separation of the liquid air from the gas mixture containing small drops in suspension, passing through the coil.

From the above description of the operation taken in connection with the drawings and the description thereof, it will be seen that the process consists in primarily cooling compressed air down to a temperature of approximately −135° C. by means of one or more of the constituents into which the liquid air has been separated, then conveying the primarily cooled compressed air to a receptacle for the liquid oxygen, to evaporate the latter and at the same time further reduce the temperature of the compressed air. The compressed air is then expanded into a space having a lower pressure than that of the compressed air so that the compressed air is liquefied, after which the liquid air flows down through a conduit and up through a return conduit from the upper ends of which it flows into one or more long tubes, i. e. the tubes 31, or their equivalents, which are subjected to the heat of the rising gases from the oxygen tank to rectify the liquid air. In rectification of the liquid air the nitrogen gases emerge from the upper ends of the tubes 31, and the oxygen flows from the lower end of said tubes into the receptacle 11 in liquid form. The nitrogen which flows from the upper ends of the tube 31 into the chamber 19 is at a temperature of about −190° C. and a pressure of about 1 atm. and flows up around the coil 43 and out through the pipe 41 to the primary counter-current apparatus 5 for the purpose heretofore set forth, i. e. to reduce the temperature of the incoming compressed air.

According to the process described it will be seen that air is liquefied and is separated into its constituents, i. e. nitrogen and oxygen by being rectified without allowing the vapors of liquid air or of liquid oxygen or of liquid air rich in oxygen which furnish the heat for the rectification, to come into actual physical contact with the liquid air being rectified, so that the liquid air which is being rectified is rectified not by the vapors used to heat and evaporate it, but by the vapors generated from itself, for, as the air within the tubes is heated and partially evaporated, the nitrogen being more volatile, tends to evaporate first, together with more or less oxygen, and as the vapors rise toward the top of the apparatus an equilibrium is established between the rising vapors and the descending liquid, oxygen being condensed and nitrogen evaporated with the result that the vapors become correspondingly richer and richer in nitrogen as they approach the top of the apparatus, and the liquid richer in oxygen as it approaches the bottom of the apparatus.

The liquid air is thus rectified by the establishment of an equilibrium within the tubes 31 between the liquid air itself and the vapors generated from it, the liquid and vapors being separated from the heating vapors surrounding the tubes.

As set forth, the heating of the tubes 31 can be effected by the vapors of evaporated liquid air or liquid oxygen rising from the chamber 11 and ascending around the tubes 31, these vapors being of a temperature, approximately —183° C. so that the liquid air within the tubes 31 is maintained at a temperature between that of the boiling point of the liquid oxygen and that of the liquid nitrogen at the particular pressure at which the interior of the tubes is maintained, say about 1 atm. This temperature of the liquid air is also somewhat controlled by the regulation of the air in the tubes, the temperature of this air gradually decreasing from the top downward, and being maintained between the limits already indicated. The process of the present invention offers the advantages, however, that it can be carried out without elaborate apparatus for maintaining higher pressures, and the liquid air is rectified by vapors which are not brought in direct contact with the liquid air while it is being rectified.

This application is in part a continuational application of my prior application Serial No. 627,549, filed May 16, 1911.

What I claim and desire to secure by Letters Patent of the United States is:

1. The process of separating liquid air into its constituents which consists in flowing the liquid air through a conduit of considerable length, subjecting the conduit to sufficient heat to rectify the liquid air therein, and collecting the nitrogen at the head of the conduit and the oxygen at the base thereof.

2. The process of separating liquid air into its constituents which consists in flowing the liquid air through a conduit of considerable length, subjecting the conduit to heat to rectify the liquid air, collecting the nitrogen at the head of the conduit and the oxygen at the base thereof, and evaporating the oxygen and using the resulting vapors as the heating medium for the said conduit.

3. The process of separating liquid air into its constituents which consists in liquefying air by cooling and compressing the same and expanding the cold compressed air, flowing the liquid air through a conduit of considerable length, subjecting the conduit to heat to rectify the liquid air, collecting the nitrogen at the head of the conduit and the oxygen at the base thereof, and evaporating the oxygen to serve as the heating medium for the said conduit and as a cooling medium for the unexpanded compressed air.

4. The process of separating liquid air into its constituents which consists in liquefying air by cooling and compressing the same and expanding the cold compressed air, flowing the liquid air through a conduit of considerable length, heating the conduit to rectify the liquid air and separate it into nitrogen and liquid oxygen, and employing the nitrogen to cool the unexpanded compressed air.

5. The process of separating liquid air into its constituents which consists in liquefying air by cooling and compressing the same and expanding the cold compressed air, flowing the liquid air through a conduit of considerable length, heating the conduit to rectify the liquid air and separate it into nitrogen and liquid oxygen, and employing the nitrogen and oxygen to cool the unexpanded compressed air.

6. The process of separating liquid air into its constituents which consists in liquefying air by cooling and compressing the same and expanding the cold compressed air, flowing the liquid air through a conduit of considerable length, heating the conduit to rectify the liquid air and separate it into nitrogen and liquid oxygen primarily cooling the unexpanded compressed air by the nitrogen and then cooling it by the liquid air.

7. The process of separating liquid air into its constituents which consists in liquefying air by cooling and compressing the same and expanding the cold compressed air, flowing the liquid air through a conduit of considerable length, heating the conduit to rectify the liquid air and separate it into nitrogen and liquid oxygen, primarily cooling the unexpanded compressed air by the nitrogen, and then cooling it by the liquid oxygen and the liquid air before it is rectified.

8. The process of separating liquid air into its constituents which consists in liquefying air by cooling and compressing the same and expanding the cold compressed air, flowing the liquid air through a conduit of considerable length, heating the conduit to rectify the liquid air and separate it into nitrogen and liquid oxygen primarily cooling the unexpanded compressed air by the nitrogen and oxygen and then cooling it by the liquid air.

9. The process of separating liquid air into its constituents which consists in liquefying air by cooling and compressing the same and expanding the cold compressed air, flowing the liquid air through a rectifying column subjected to heat to separate the liquid air into nitrogen and oxygen, evaporating the liquid oxygen by means of the unexpanded compressed air, and employing the resulting vapors as the heating medium for the rectifying column.

10. The process of separating liquid air into its constituents which consist in liquefying air by cooling and compressing the same and expanding the cold compressed air, flowing the liquid air through a rectifying column subjected to heat to separate the liquid air into nitrogen and oxygen, evaporating the liquid oxygen by means of the unexpanded compressed air, and employing the resulting vapors as the heating medium for the rectifying column, and as a cooling medium for the unexpanded compressed air.

11. The process of rectifying liquid air by subjecting the same in thin streams to the action of heating vapors without contact or intermixture of the air being rectified and the heating vapors.

12. The process of rectifying liquid air by heating the same in the form of thin streams by the vapors of liquid air or liquid oxygen while preventing intermixture or contact of the heating vapors and the heated liquid.

13. The process of rectifying liquid air by allowing the liquid to flow in thin streams through long narrow tubes suitably heated from the outside.

14. The process of rectifying liquid air which comprises separating liquid air into liquid oxygen or liquid rich in liquid oxygen, and vapors rich in nitrogen, evaporating the resulting liquid and subjecting liquid air to the heating action of the resulting vapors without direct contact therewith.

15. The process of rectifying liquid air which comprises bringing ascending heating vapors into heat interchanging relation with descending liquid air in the form of thin streams without direct contact of the ascending and descending streams.

16. The process of rectifying liquid air which comprises bringing ascending vapors of liquid air or liquid oxygen into heat interchanging relation with descending streams of liquid air without direct contact of the air and the ascending vapors.

In testimony whereof I have hereunto signed my name in the presence of two subscribing witnesses.

GOTTHOLD HILDEBRANDT.

Witnesses:
HENRY HASPER,
WOLDEMAR HAUPT.

It is hereby certified that in Letters Patent No. 1,119,158, granted December 1, 1914, upon the application of Gotthold Hildebrandt, of Berlin, Germany, for an improvement in "Processes of Separating Liquid Air into its Constituents," errors appear in the printed specification requiring correction as follows: Page 1, line 108, for the word "is" read *its;* page 3, line 99, after the word "is" insert the word *about;* and that the said Letters Patent should be read with these corrections therein that the same may conform to the record of the case in the Patent Office.

Signed and sealed this 19th day of January, A. D., 1915.

[SEAL.]

R. F. WHITEHEAD,

*Acting Commissioner of Patents.*